United States Patent [19]

Schopper et al.

[11] 4,227,746

[45] Oct. 14, 1980

[54] BRAKING PRESSURE CONTROL UNIT FOR A DUAL CIRCUIT BRAKE SYSTEM

[75] Inventors: Bernd Schopper, Frankfurt; Peter Tandler, Falkenstein, both of Fed. Rep. of Germany

[73] Assignee: ITT Industries, Inc., New York, N.Y.

[21] Appl. No.: 965,661

[22] Filed: Dec. 1, 1978

[30] Foreign Application Priority Data

Dec. 3, 1977 [DE] Fed. Rep. of Germany ....... 2753948
Dec. 3, 1977 [DE] Fed. Rep. of Germany ....... 2753949

[51] Int. Cl.³ .......................... B60T 8/26; B60T 11/10
[52] U.S. Cl. ..................................... 303/6 R; 137/87; 303/6 C; 303/22 R
[58] Field of Search .................. 137/87; 188/195, 349; 303/6 C, 22 R, 6 R

[56] References Cited

U.S. PATENT DOCUMENTS

| | | | |
|---|---|---|---|
| 3,973,578 | 10/1976 | Heibel et al. | 303/6 C X |
| 3,992,063 | 11/1976 | Falk | 303/6 C |
| 4,025,123 | 5/1977 | Oberthuer | 303/22 R X |
| 4,053,185 | 10/1977 | Carre | 303/22 R X |
| 4,053,186 | 10/1977 | Jakobi | 303/22 R X |

FOREIGN PATENT DOCUMENTS 1915485 10/1973 Fed. Rep. of Germany .
2556718 7/1977 Fed. Rep. of Germany .......... 303/6 C

*Primary Examiner*—Douglas C. Butler
*Attorney, Agent, or Firm*—John T. O'Halloran; Alfred C. Hill

[57] ABSTRACT

The braking pressure control unit for a dual circuit brake system comprises a housing with two closure members arranged therein coaxially and in tandem. In their rest position, the closure members are held spaced apart from associated valve seats by a control force. The control force acts directly on a first of the two closure members which in turn bears against a second of the two closure members provided both are in the open positions. At least one closure member consists of a shaft element having one end in an operative relationship with the adjacent end of the other closure member and a closure element in a slidably sealed relationship with the outer surface of the shaft element, the closure element being displaced between limits of the shaft element. A weak closure spring biases the closure element toward its associated valve seat.

17 Claims, 6 Drawing Figures

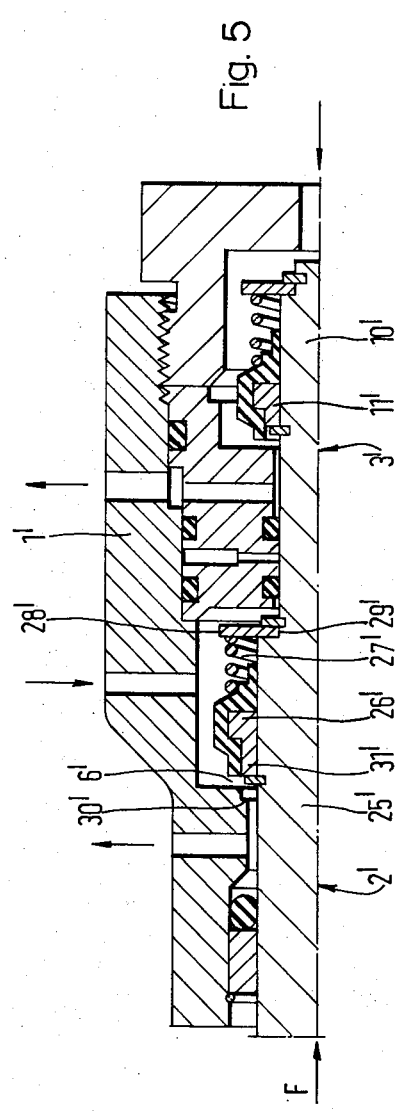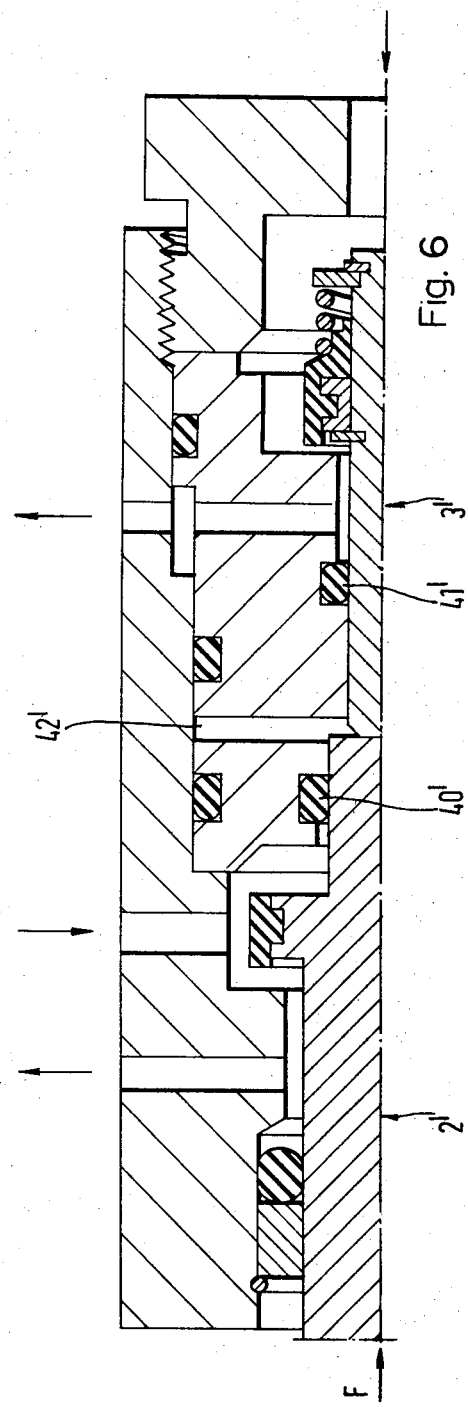

BRAKING PRESSURE CONTROL UNIT FOR A DUAL CIRCUIT BRAKE SYSTEM

BACKGROUND OF THE INVENTION

This invention relates to a braking pressure control unit for a dual-circuit brake system wherein a housing accommodates two valve chambers arranged coaxially in tandem and each having a respective valve seat and a respective closure member which in the rest position is held spaced apart from the valve seat associated with the closure member by a control force.

Such a braking pressure control unit is known from the German Patent DE-OS No. 1,915,485. Braking pressure control units of this type are especially used for dual-circuit brake systems wherein the two rear-wheel brakes are adapted to be subjected to the pressures from different brake circuits.

In such an arrangement, there is the requirement for both rear-wheel brakes during braking to be subjected to a pressure as even as possible in order to have a braking force of the same magnitude at both brakes. In the prior known braking pressure control unit, this requirement is inadequately fulfilled. In this known arrangement, the closure member on the side close to the control force has to close later than the other closure member for reasons of principle. If it closed earlier, there would be no possibility any longer for the other closure member to reach its closing position because it can only move towards the closing position by displacement of the closure member on the side close to the control force. Only the first closure member is able to be displaced by the metered application of pressure. The other closure member can only follow the displacement of the first closure member because it is held in abutment against the first closure member by a return spring.

For this reason, pressure is still being built up in the first brake circuit associated with the closure member on the side close to the control force whereas in the other brake circuit the pressure-fluid connection between the master cylinder and the wheel cylinders is already closed, with the pressure build-up thus being terminated. From this it results necessarily that the pressure built up in the first brake circuit is higher than that in the second brake circuit.

There is another reason of principle which leads to different braking pressures in both brake circuits. As long as both closure members are in the open position, the control force is reduced by the force of the return spring. However, when the second closure member has reached its closing position, the return spring no longer bears against the control force but against the housing via the valve seat. As a result, the moment the second closure member closes, the control force effectively acting on the first closure member will be increased. This leads to another retardation of the closing movement of the first closure member.

SUMMARY OF THE INVENTION

It is an object of this invention to provide a braking pressure control unit of the type initially referred to in such a manner as to ensure a pressure build-up as even as possible in both brake circuits.

According to the invention, this object is achieved by arranging for the control force to bear directly against a first closure member which, in the open position of both closure members, rests against the second closure member, which second closure member is biased in the closing direction in the direction of the control force by a return spring at a force less than the control force, wherein at least one closure member consists of a shaft element in an operative relationship with the other closure member and of a closure element displaceable thereon between limits and biased in the direction of the valve seat by a weak closure spring.

Owing to this design, the return spring will continue to act against the control force even after the second closure member has moved towards the associated valve seat with its closure element. As a result, the effective control force of the first closure member on the side close to the control force remains unchanged even after closing of the second closure member, thus meeting a substantial requirement for the building up of identical pressures in both brake circuits. Because the return spring is at all times effective, it may be designed as a relatively strong spring so that the inertia of the second closure member when it follows the closing movement of the first closure member is low. In contrast to the state of the art, an increase in the force of the return spring does not result in an increased difference between the pressures in the brake circuits, on the contrary, they will become more even.

It is within the scope of this invention to arrange for either the first or the second closure member to consist of a shaft element and a closure element slidable thereon. The decision in favor of the one or the other construction depends on which brake circuit is desired to have a slightly higher pressure than the other brake circuit.

The braking pressure control unit of the invention permits a particularly simple design if the return spring is arranged to bear against a disc held against the collar of the shaft element, with the closure spring bearing on the other side of the disc.

In another advantageous improvement of this invention, the first and the second closure member each consist of a shaft element and a closure element slidable thereon.

In this design it is irrelevant which of the two closure members reaches the closing position first. Therefore, the braking pressure control unit may be dimensioned such that both closure members close simultaneously. In this manner, the two reasons named at the beginning for a different pressure build-up in the prior known braking pressure control unit are eliminated. The control force remains always constant. Both closure members are in a position to reach their closing positions precisely simultaneously. While it is true that manufacturing tolerances lead to different pressures in the two brake circuits of the braking pressure control unit of the invention, these pressures cannot, however, influence their mode of function on principle, in contrast to the prior known braking pressure control unit. Irrespective of which closure member closes first, the other closure member is always in a position to reach its closing position subsequently.

In another advantageous embodiment, the effective areas of both closure members are different. By this measure it can be achieved that, in the event of failure of the one brake circuit, the brake pressure built up in the still operable brake circuit is higher than if both brake circuits were operable.

In a second solution, the first closure member is designed as a stepped piston having a portion of larger cross-section arranged to extend out of the first valve chamber in a sealed relationship thereto towards the control force, while its portion of smaller cross-section is arranged to extend out of the first valve chamber in a sealed relationship thereto towards the second closure member.

Since the first closure member is arranged to extend out of the first valve chamber in a sealed relationship thereto towards the second closure member, the pressure prevailing in the first valve chamber does not act upon the closure member of the second valve chamber. As a result, when pressure starts building up, the second closure member tends to move in its valve chamber in the closing direction in opposition to the control force. In contrast to this arrangement, the closure member of the braking pressure control unit of the above cited German Patent was pressure-balanced so that it could be moved into its closing position only by the force of a return spring. Since, however, the pressure metered into the two valve chambers acts on the closure members in the closing direction, a retarded closing of a closure member as a result of forces of inertia cannot occur. In the braking pressure control unit constructed in accordance with the invention, the control force is always constant because no return spring acts in opposition to the control force as long as the second closure member is in the open position.

Owing to the fact that in intact brake circuits a force counteracting the control force is generated through the effective areas of both brake circuits, in the event of failure of a brake circuit through one effective area only, displacement of the closure member into the closing position occurs only at higher pressures. Therefore, the supply of pressure to the still intact brake circuit will be interrupted at a pressure substantially higher than if both brake circuits were operative. By these means, in the event of failure of one brake circuit, the braking pressure control unit of the invention allows stronger braking of the brake associated with the intact brake circuit than would be the case if both brake circuits were intact.

In an advantageous embodiment of this invention, one of the closure members consists of a shaft element and of a closure element slidable thereon in a sealed relationship thereto and being biased in the direction of its valve seat by a closure spring, in its rest position being, however, kept spaced apart from the valve seat by a shoulder provided on the shaft element.

This design permits substantial manufacturing tolerances. To this end, the closure member incorporating the slidable closure element must be so dimensioned that it always reaches its closing position earlier than the other closure member does. This latter member may then continue to be displaced until it likewise closes. Of course, a higher pressure will develop in the brake circuit which is shut off later, in accordance with the manufacturing tolerances.

According to another embodiment, this can be prevented by designing both closure members so that they each consist of a shaft element and a closure element slidable thereon in a sealed relationship thereto. In such a design, the braking pressure control unit may be so designed that both closure members close at precisely the same time, thus ensuring an accurately even pressure in both brake circuits.

In another advantageous embodiment, the two closure members are integrally formed. This construction is advantageous from the point of view of manufacture.

If, in accordance with another improvement, the closure member on the side close to the control force is provided with a slidable closure element and movable in the direction of the control force against a stop formed in the housing, the maximum travel of this first closure member in the direction of the control force is limited although there is no closure element secured thereto which moves against a valve seat. As a result of this limitation of the maximum possible travel of displacement, the volume consumption of the braking pressure control unit is kept small so that the pedal travel necessary during braking can be made optimum use of for force transmission.

From the point of view of manufacture, it may also be advantageous to provide for mutual contact of the two closure members in an unpressurized chamber between the two valve chambers.

The increase of the cut-off pressure in the intact brake circuit in the event of failure of one brake circuit which is made possible by the invention can be influenced particularly freely and be adapted to the particularities of the vehicle for which the braking pressure control unit is intended, if, in accordance with another embodiment of the invention, the portion of the first closure member extending out of the first valve chamber in the direction of the second valve chamber has a diameter different from the diameter of the closure member extending out of the second valve chamber in the direction of the control force.

BRIEF DESCRIPTION OF THE DRAWING

Above-mentioned and other features and objects of this invention will become more apparent by reference to the following description taken in conjunction with the accompanying drawing, in which:

FIG. 5 is a longitudinal cross-sectional view taken through the upper half of a fifth embodiment of the braking pressure control unit constructed in accordance with the principles of the present invention; and FIG. 6 is a longitudinal cross-sectional view taken through the upper half of a sixth embodiment of the braking pressure control unit constructed in accordance with the principles of the present invention.

DESCRIPTION OF THE PREFERRED EMBODIMENT

Figure 1:
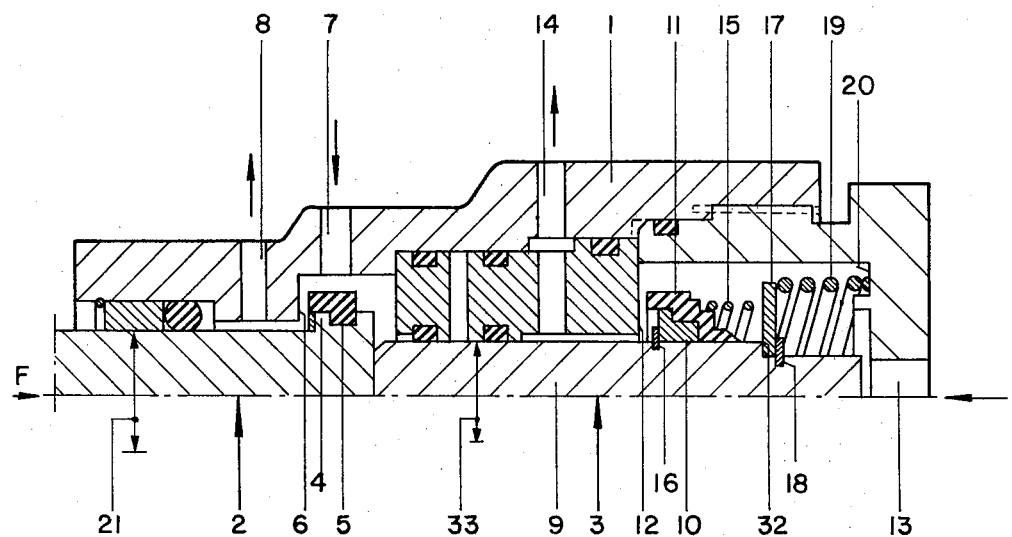
FIG. 1 is a longitudinal cross-sectional view taken through the upper half of a first embodiment of the braking pressure control unit constructed in accordance with the principles of the present invention.

The embodiment of FIG. 1 shall be described first. FIG. 1 shows a housing 1 having several steps and accommodating a first closure member 2 and a second closure member 3 arranged coaxially and slidably in tandem. A control force F acts directly on the first closure member 2 and, because of the first closure member 2 bearing against the second closure member 3, on the second closure member 3 indirectly. The first closure member has a closure element 4 integrally formed therewith which, with a seal 5, is movable against a valve seat 6 during displacement of the closure member 2 in opposition to the control force F. This displacement permits closing off of a pressure-fluid connection of a fluid inlet port 7 in housing 1 to a fluid outlet port 8 in housing 1.

The second closure member 3 consists of a shaft element 9 and a closure element 10 disposed thereon in a slidably sealed relationship. Similar to the closure element 4 of the first closure member 2, closure element 10 has a seal 11 with which it is movable against a valve seat 12. This displacement permits closing off of a pressure-fluid connection of a second fluid inlet port 13 in the housing 1 to a second fluid outlet port 14 in the housing 1.

In the position illustrated, the closure element 10 is held in abutment against a circlip 16 in the shaft element 9 by a weak closure spring 15. The other end of the closure spring 5 bears against a disc 17 which is secured in the shaft element 9 by a circlip 18 and a shoulder 32. A return spring 19 has one end bearing on the side of the disc 17 remote from the closure spring 15 and its other end abutting against a stop 20 formed in the housing 1.

For the purpose of the following explanation of the mode of operation of the braking pressure control unit of the invention, an effective area 21 has been marked in the drawing which is subjected to the hydraulic force transmitted through the fluid and counteracting the control force F.

The operation of the braking pressure control unit described is as follows: It is assumed first that both brake circuits are operative and that pressure fluid is adapted to be supplied into the braking pressure control unit through both the fluid inlet port 7 and the second fluid inlet port 13.

The supplied pressure fluid is initially allowed to flow to the fluid outlet ports 8 and 14 unhindered. Pressure will build up in the two brakes not shown. This pressure acts on the effective area 21 of the closure member 2 so that closure member 2 tends to be displaced to the left when viewing the drawing in opposition to the control force F. Since the return spring 19 holds the shaft element 9 of the second closure member 3 in abutment on the first closure member 2 through the shoulder 32, the second closure member 3 follows the displacement of the first closure member 2. With the displacement continuing sufficiently, the seal 11 thereby moves into seating engagement with the valve seat 12, thus closing off the fluid connection of the second fluid inlet port 13 to the second fluid outlet port 14.

The force of the return spring 19 and the pressure applied to the effective area 21 cause still further displacement of the closure member 2 in opposition to its control force F so that immediately after closing of the second closure member 3, the seal 5 moves likewise into seating engagement with the valve seat 6, thereby closing off the pressure-fluid connection of the fluid inlet port 7 to the fluid outlet port 8.

In the event of failure of one of the two brake circuits, there occurs practically no change in the braking pressure control unit for the still intact brake circuit so that the respective closure member closes at nearly the same pressure at which it would close if both circuits were operative.

Figure 2:
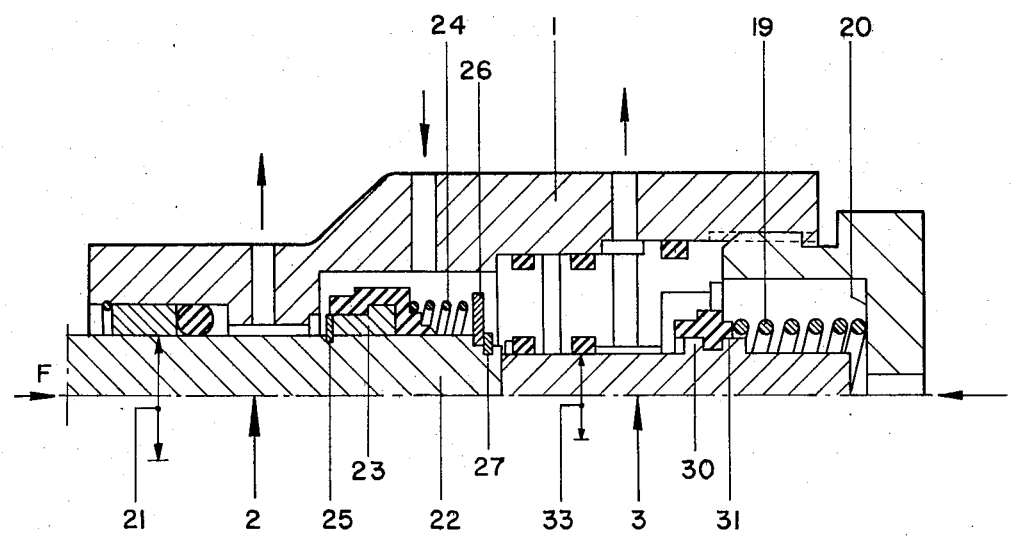
FIG. 2 is a longitudinal cross-sectional view taken through the upper half of a second embodiment of the braking pressure control unit constructed in accordance with the principles of the present invention.

In the embodiment of FIG. 2, functionally like parts have been assigned like reference numerals. The difference between this embodiment and the embodiment of FIG. 1 is in essence the following: The closure member 2 consists of a shaft element 22 and a closure element 23 disposed thereon in a slidably sealed relationship. This closure element 23 is held against a circlip 25 in the shaft element 22 by a closure spring 24. The other end of the closure spring 24 bears against a disc 26 which is axially secured in shaft element 22 by a circlip 27.

Similar to the first closure member 2 of the embodiment of FIG. 1, the second closure member 3 has a closure element 30 integrally formed therewith. The return spring 19 has one end bearing directly against the stop 20 formed in the housing 1 and its other end bearing against a shoulder 31 of the closure member 3.

The mode of operation of this embodiment differs from that of FIG. 1 in that the braking pressure control unit must be designed such that the first closure member 2 reaches its closing position before the second closure member 3. If the second closure member 3 were the first to reach its closing position, the return spring 19 would no longer abut on the shaft element 22 of the first closure member 2 so that the control force actually acting thereon would increase and thus result in a substantially retarded cut-off. In contrast to the embodiment of FIG. 1, however, both closure members 2, 3 are able to reach their closing positions, no matter which one reaches it first.

Figure 3:
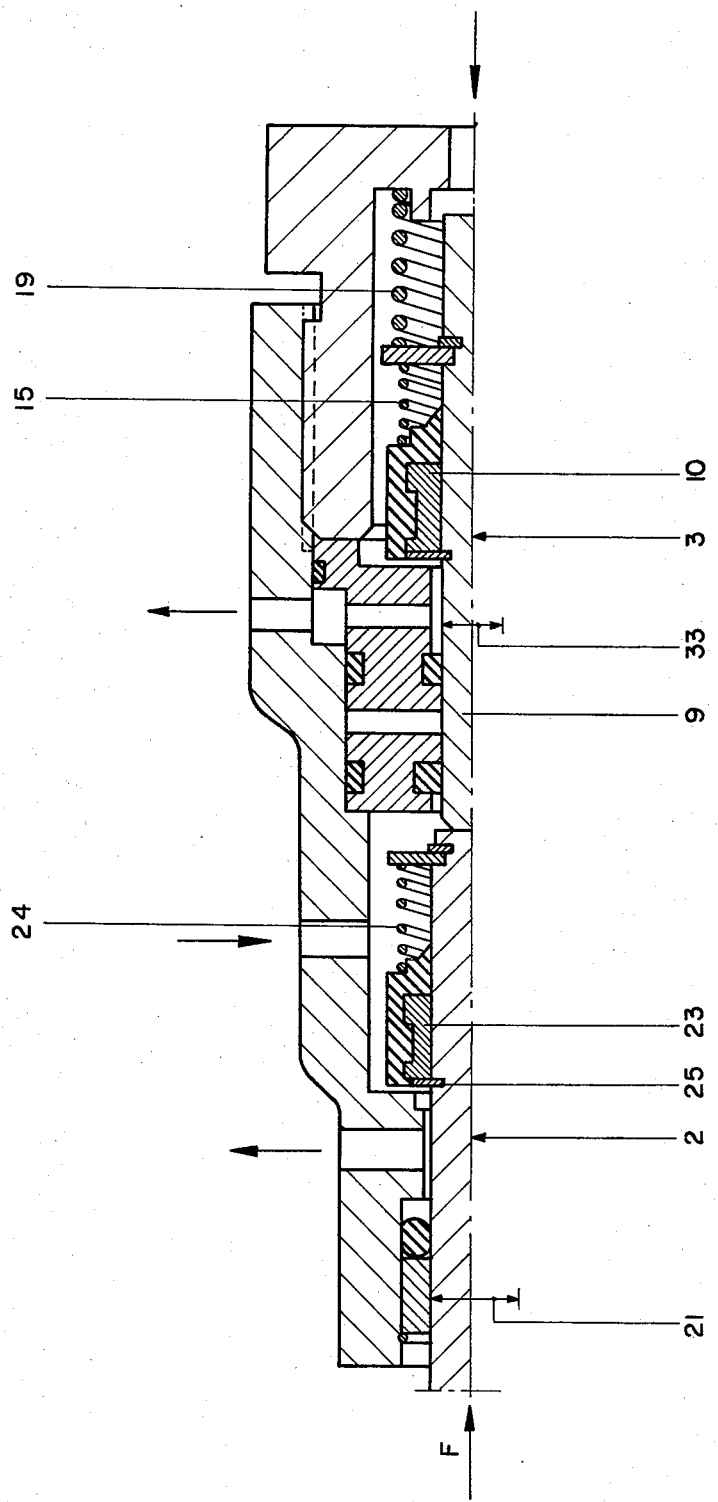
FIG. 3 is a longitudinal cross-sectional view taken through the upper half of a third embodiment of the braking pressure control unit constructed in accordance with the principles of the present invention.

In the embodiment of FIG. 3, the closure member 2 is of the same design as the one in the embodiment of FIG. 2. Similarly, it has a displaceable closure element 23 which is held against a circlip 25 by a closure spring 24.

The closure member 3 in turn has, similar to the closure member 3 of the embodiment of FIG. 1, a closure element 10. Equally, the arrangement of the closure spring 15 and of the return spring 19 corresponds to the embodiment of FIG. 1.

The mode of operation of this embodiment differs from that of the embodiments previously described in that both closure members 2, 3 are able to close at precisely the same time.

Figure 4:
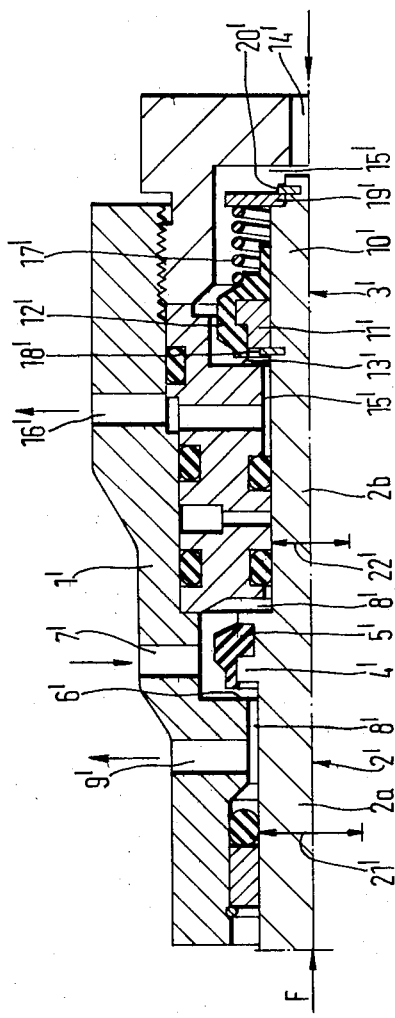
FIG. 4 is a longitudinal cross-sectional view taken through the upper half of a fourth embodiment of the braking pressure control unit constructed in accordance with the principles of the present invention.

FIG. 4 shows a housing 1' having several steps and accommodating a first closure member 2' and a second closure member 3' arranged coaxially and slidably in tandem. The two closure members 2' and 3' constitute an integrally formed component. A control force F acts directly on the first closure member 2' and, because of the first closure member 2' being integrally formed with the second closure member 3', also on the second closure member 3'. The first closure member 2' has a closure element 4' integrally formed therewith which, with a seal 5', is movable against a valve seat 6' during displacement of the closure member 2' in opposition to the control force F. This permits closing off of a pressure-fluid connection of a fluid inlet port 7' in housing 1' to a fluid outlet port 9' in housing 1' through a first valve chamber 8'.

The first closure member 2' is a stepped piston having a portion 2a of larger diameter and a portion 2b of smaller diameter. In this arrangement, the larger-diameter portion 2a extends towards the control force F, and the smaller-diameter portion 2b extends towards the second closure member 3' out of the valve chamber 8'.

The second closure member 3' consists of a shaft element 10' and a closure element 11' disposed thereon in a slidably sealed relationship. Similar to the closure element 4' of the first closure member 2', closure element 11' has a seal 12' with which it is movable against a valve seat 13'. Such a displacement permits closing off of a pressure-fluid connection of a second fluid inlet port 14' in housing 1' to a second fluid outlet port 16' in housing 1' through a second valve chamber 15'.

In the position illustrated, the closure element 11' is held in abutment against a collar 18' formed by a circlip in the shaft element 10' by a weak closure spring 17'. With its other end, the closure spring 17' bears against a disc 19' which is secured in the shaft element 10' by a circlip 20'.

For the purpose of the following explanation of the mode of operation of the braking pressure control unit of FIG. 4, an effective area 21' has been marked in the drawing which is subjected to the hydraulic force transmitted through the fluid and counteracting the control force F when both brake circuits are operable. Similarly, an effective area 22' has been marked with which the closure member 2' extends out of the first valve chamber 8' and which forms the shaft element 10' of the second closure member 3'.

The operation of the braking pressure control unit illustrated in FIG. 4, is as follows: As long as pressure is built up in both brake circuits, the pressure in valve chamber 15' acts on effective area 22' while the pressure in valve chamber 8' acts on the differential area between effective area 21' and effective area 22'. As a result, the closure members 2',3' move to the left when viewing the drawing, in opposition to the control force F. This leads initially to closing of the valve seat 13' as a result of the seating engagement of the seal 12' onto the valve seat 13'. Since the closure element 11' is slidably arranged on the shaft element 10', the closure member 2' is able to continue its movement against the control force F together with the shaft element 10' until the closure element 4' has moved towards the valve seat 6', thus interrupting the pressure supply in that circuit.

If a failure of one of the two brake circuits occurs, either the effective area 22' alone is exposed to pressure or, in the other brake circuit, the differential area between the effective surfaces 21' and 22'. As a result, the pressure counteracting the control force F acts on a reduced surface only. The consequence is that the closure member concerned remains in its open position for a longer period of time, thus permitting an increased braking pressure being built up in the intact brake circuit.

The embodiment of FIG. 5 differs from the embodiment of FIG. 4 essentially in that not only does the closure member 3' consist of a shaft element 10' and a closure element 11' slidable and sealed thereon but also the closure member 2' consists of a shaft element 25' and a closure element 26' arranged thereon in a slidable and sealed relationship. Precisely similar to closure element 11', this closure element 26' is biassed towards the valve seat 6' by a closure spring 27'. In the rest position, the closure element 26' rests against a shoulder 31' formed by a circlip so that it is held spaced apart from the valve seat 6'. The closure spring 27' in turn bears against a disc 28' which is held in place by a shoulder 29' formed by a circlip. Since the shaft element 25' can no longer be secured axially through the closure element 26' and the valve seat 6', a stop 30' is provided on the housing 1' towards which a collar of the shaft element is adapted to move.

The embodiment of FIG. 6 corresponds largely to the embodiment of FIG. 4. However, the closure members 2' and 3' are not integrally formed, on the contrary, they are individual components mutually contacting each other in an unpressurized chamber 42' which is formed between two seals 40',41'. In this arrangement, the portions of the closure members 2' and 3' extending into this chamber 42' have different diameters which influence the behavior of the braking pressure control unit in the event of failure of one circuit.

While we have described above the principles of our invention in connection with specific apparatus it is to be clearly understood that this description is made only by way of example and not as a limitation to the scope of our invention as set forth in the objects thereof and in the accompanying claims.

We claim:

1. A braking pressure control unit for a dual-circuit brake system comprising:

a housing accommodating therein two coaxial valve chambers disposed in tandem with respect to each other;

a valve seat disposed in each of said valve chambers; and a closure member disposed in each of said valve chambers in an opening and closing relationship with an associated one of said valve seats, each of said closure members, in the rest position, being held in a spaced relationship with its associated one of said seats by a control force;

at least one of said closure members includes.

a first shaft element having one end in an operative relationship with an adjacent end of the other of said closure members, a first closure element in a slidably sealed relationship with the outer surface of said first shaft element, said first closure element being displaceable between limits on said first shaft element, and a first closure spring biasing said first closure element toward an associated one of said valve seats.

2. A control unit according to claim 1, wherein said one of said closure members is indirectly acted upon by said control force, and further including a return spring bearing against a shoulder formed in said first shaft element.

3. A control unit according to claim 1, wherein said other of said closure members is directly acted upon by said control force and includes a second shaft element having one end in an operative relationship with an adjacent end of said first shaft element, a second closure element in a slidably sealed relationship with the outer surface of said second shaft element, said second closure element being displaceable between limits on said second shaft element, and a second closure spring biasing said second closure element toward an associated one of said valve seats.

4. A control unit according to claim 1, further including a return spring bearing against one side of a disc held against a shoulder of said first shaft element, and wherein said first closure spring bears against the other side of said disc.

5. A control unit according to claim 1, wherein said other of said closure members includes a second shaft element having one end in an operative relationship with an adjacent end of said first shaft element, p2 a second closure element in a slidably sealed relationship with the outer surface of said second shaft element, said second closure element being displaceable between limits on said second shaft element, and a second closure spring biasing said second closure element toward an associated one of said valve seats.

6. A control unit according to claim 1, wherein each of said closure members have different effective areas.

7. A control unit according to claim 1, wherein said other of said closure members is a stepped piston having a first portion of larger cross-section extending out of an associated one of said two valve chambers in a sealed relationship thereto towards said control force, and a second portion of smaller cross-section extending out of said associated one of said two valve chambers in a sealed relationship thereto towards said one of said closure members.

8. A control unit according to claim 7, wherein said one of said closure members is integral with said second portion.

9. A control unit according to claim 7 wherein said closure members are in mutual contact in an unpressurized chamber disposed in said housing between said two valve chambers.

10. A control unit according to claim 7, wherein said second portion has a diameter different from the diameter of that portion of said one of said closure members extending out of its associated one of said two valve chambers toward said second portion.

11. A braking pressure control unit for a dual-circuit braking system comprising:

a housing accommodating therein two coaxial valve chambers disposed in tandem with respect to each other;

a valve seat disposed in each of said valve chambers; and a closure member disposed in each of said valve chambers in an opening and closing relationship with an associated one of said valve seats, each of said closure members, in the rest position, being held in a spaced relationship with its associated one of said valve seats by a control force; p1 a first of said closure members being a stepped piston having a first portion of larger cross-section extending out of an associated one of said two valve chambers in a sealed relationship thereto toward said control force, and a second portion of smaller cross-section extending out of said associated one of said two valve chambers in a sealed relationship thereto towards a second of said closure members.

12. A control unit according to claim 11, wherein at least one of said first and second closure members includes a shaft element having one end in an operative relationship with an adjacent end of the other of said first and second closure members, a closure element in a slidable sealed relationship with the outer surface of said shaft element, said closure element being displaceable between limits on said shaft element, and a closure spring biasing said closure element toward an associated one of said valve seats.

13. A control unit according to claim 11, wherein said one of said first and second closure members is directly acted upon by said control force and is movable toward said control force against a stop formed in said housing.

14. A control unit according to claim 11, wherein each of said first and second closure members includes a shaft element having one end in an operative relationship with an adjacent end of the other of said first and second closure members, a closure element in a slidably sealed relationship with the outer surface of said shaft element, said closure element being displaceable between limits on said shaft element, and a closure spring biasing said closure element toward an associated one of said valve seats.

15. A control unit according to claim 11, wherein said first and second closure members are integrally formed.

16. A control unit according to claim 11, wherein said first and second closure members are in mutual contact in an unpressurized chamber disposed in said housing between said two valve chambers.

17. A control unit according to claim 11, wherein said second portion has a diameter different from the diameter of that portion of said second of said closure members extending out of its associated one of said two valve chambers toward said second portion.

* * * * *